June 7, 1960 W. H. LEWIS 2,939,691
PAVEMENT CUTTING APPARATUS HAVING SPACED CUTTER DISCS
Filed Sept. 21, 1956 4 Sheets-Sheet 2
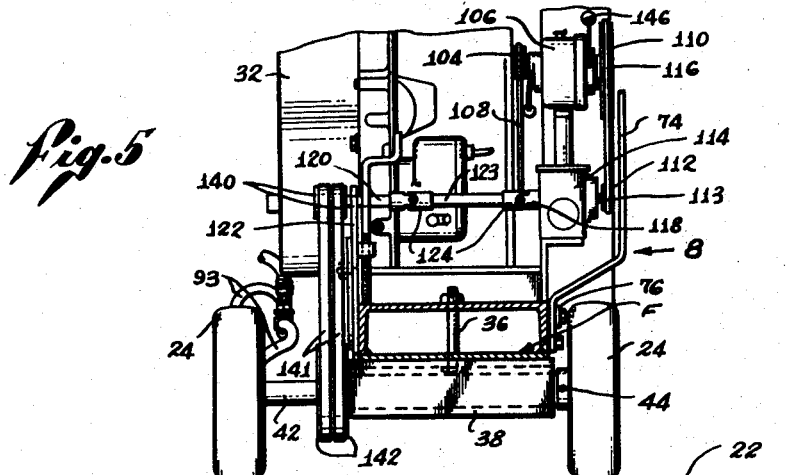
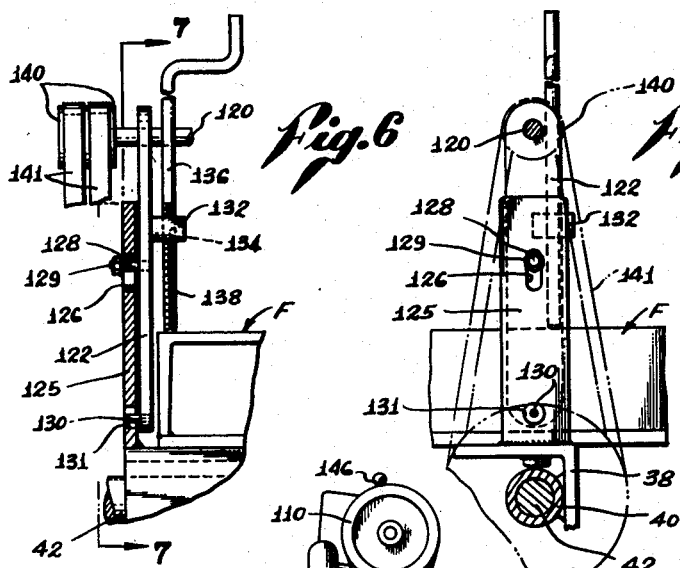
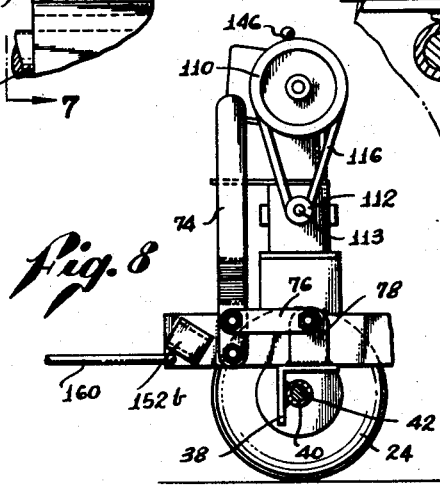
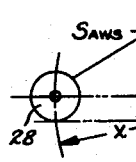
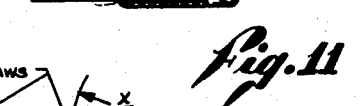
INVENTOR.
WILLIAM H. LEWIS

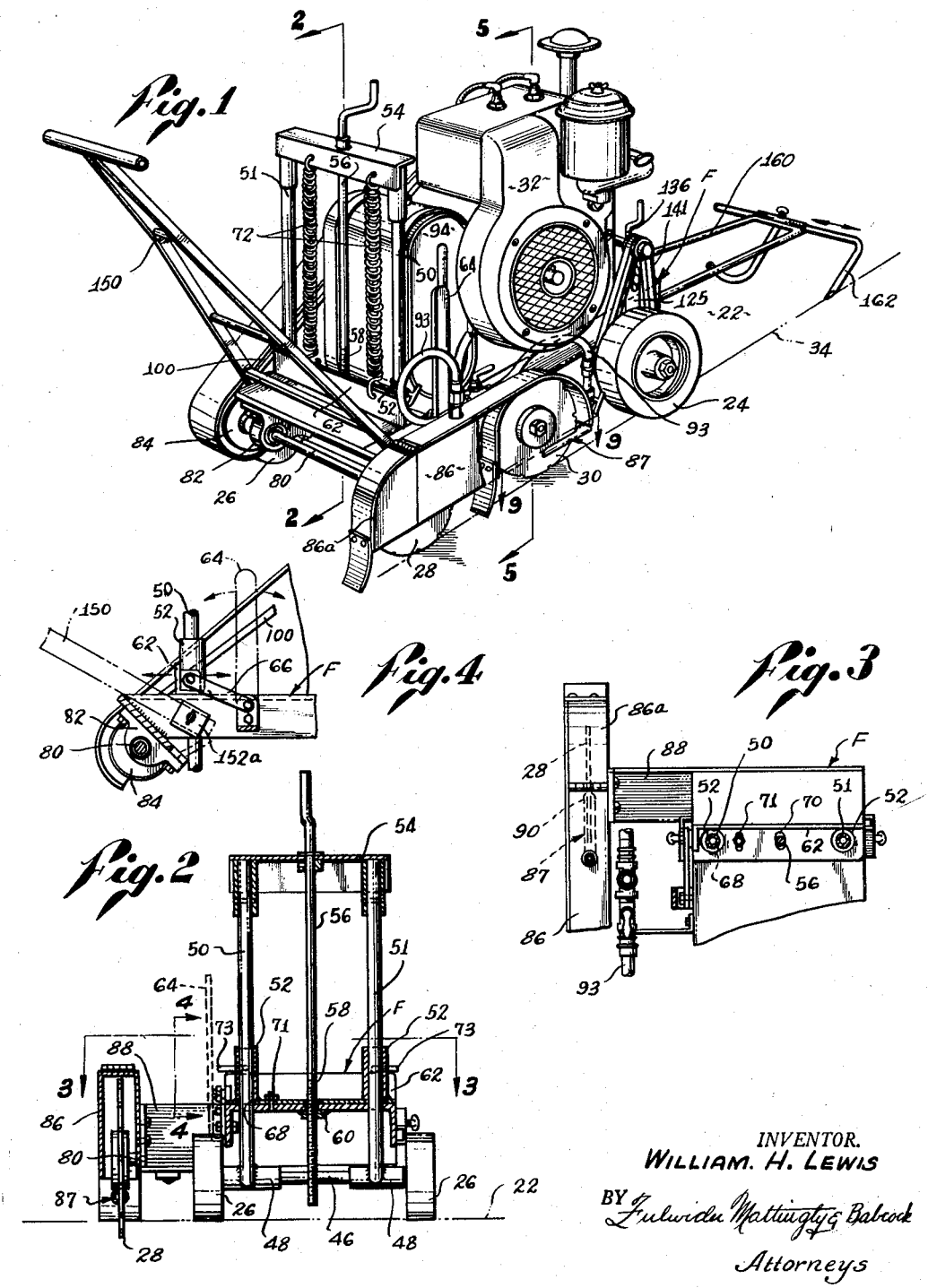

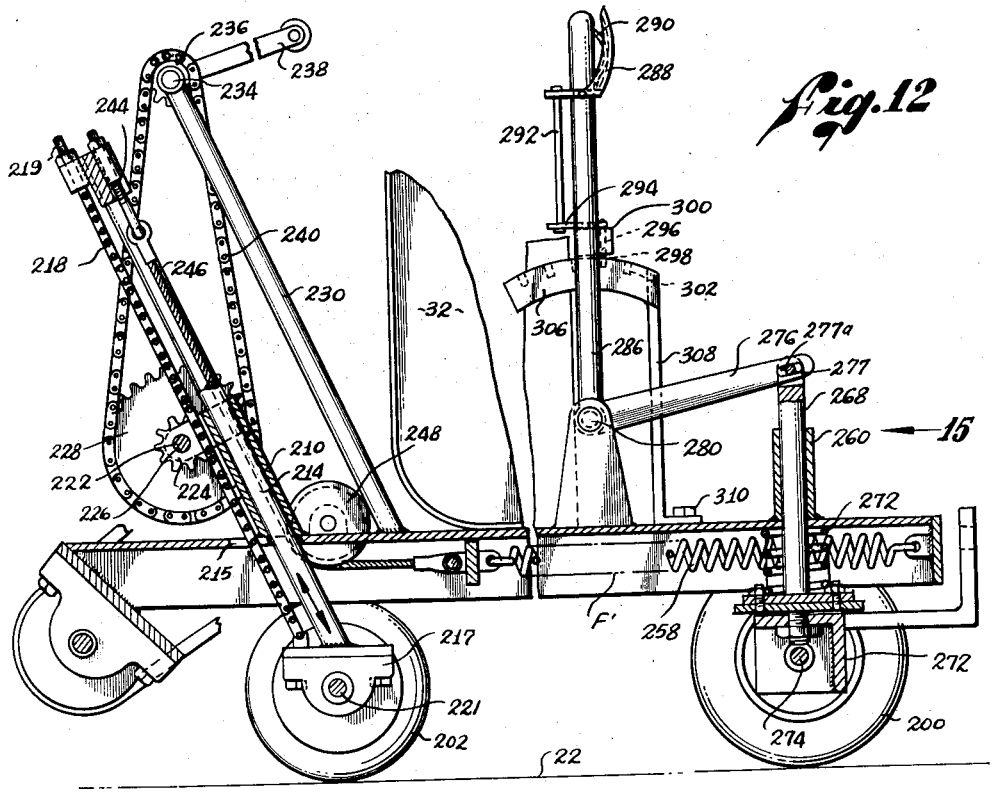
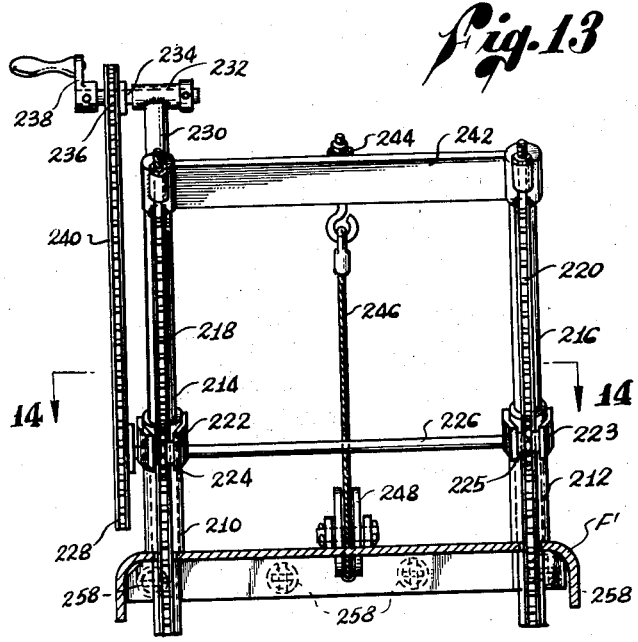

June 7, 1960  W. H. LEWIS  2,939,691
PAVEMENT CUTTING APPARATUS HAVING SPACED CUTTER DISCS
Filed Sept. 21, 1956  4 Sheets-Sheet 4
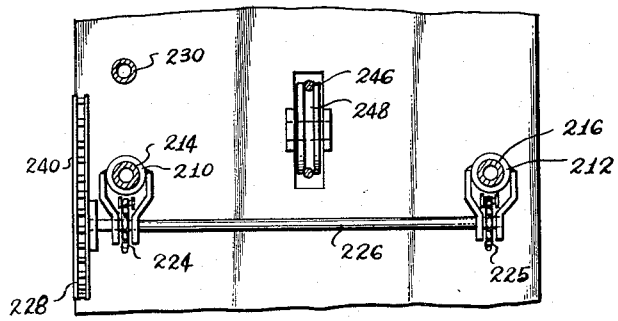
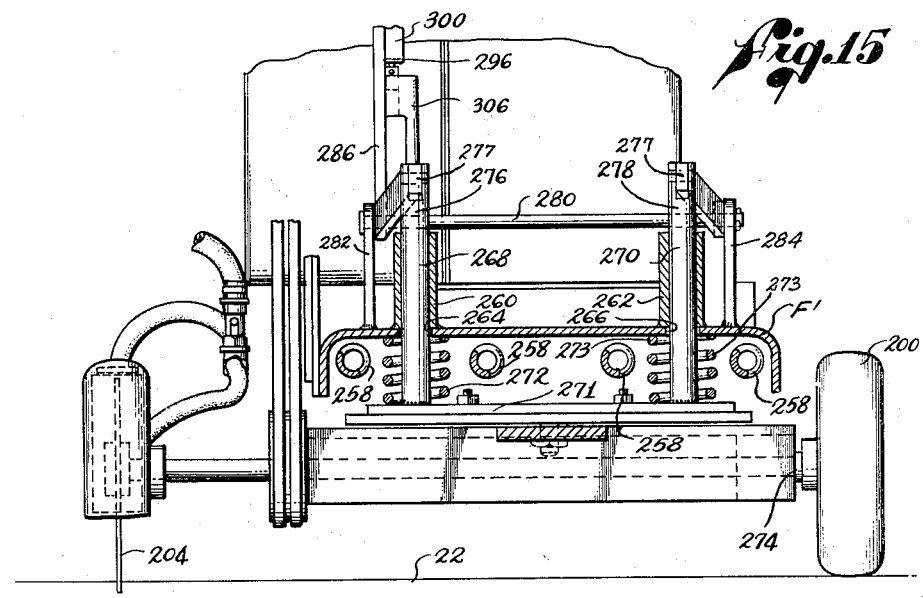
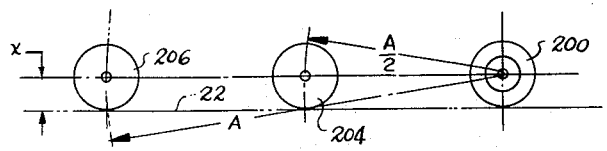
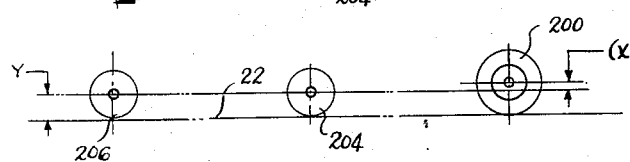
INVENTOR.
WILLIAM H. LEWIS
BY Fulwider Mattingly & Huntley
ATTORNEYS

United States Patent Office 2,939,691
Patented June 7, 1960

2,939,691

PAVEMENT CUTTING APPARATUS HAVING SPACED CUTTER DISCS

William H. Lewis, 1625 Hyland Ave., Arcadia, Calif.

Filed Sept. 21, 1956, Ser. No. 611,390

6 Claims. (Cl. 262—20)

The present invention relates generally to pavement cutting devices, and more particularly to an improved device for cutting grooves or kerfs in pavement materials such as concrete, asphalt, and the like.

This application is a continuation-in-part of patent application Serial No. 349,726 filed by me April 20, 1953, and now abandoned.

There have been heretofore proposed pavement cutting devices adapted to cut elongated grooves or kerfs in the surface of paved slabs such as roads, driveways, airport landing strips, and the like. Generally, such heretofore-proposed devices broadly comprise a wheeled frame whereon is rotatably mounted a single power-driven cutter disc, which cutter disc cuts a downwardly extending groove or kerf in the pavement as the frame is moved thereacross. Examples of such devices are shown in United States Letters Patent No. 2,468,336 and No. 2,569,682, issued to me April 29, 1949, and October 2, 1951, respectively.

The cutter discs utilized in such pavement cutting devices are generally formed by bonding diamond particles to a metallic disc, and both because of the high cost of the diamonds and of bonding the diamonds to the disc, these discs are quite expensive. In view of their high cost, it is important to obtain a long service life from such discs. Such long service life, however, cannot be obtained at a sacrifice of the rate of speed at which the pavement is cut, since in many cases, for example, where kerfs are being cut in an elongated concrete roadway, such kerfs must be cut within a definite time interval. If they are cut too soon, the concrete will not be sufficiently hard and the cutter discs will pull pebbles out of the concrete instead of cutting through them, thereby causing spalling of the top edges of the kerfs. If they are cut too late, the pavement may have contracted to such an extent that irregular cracks have formed therein.

A major object of the present invention is to provide an improved device for cutting kerfs in a paved surface.

It is a more particular object of the invention to provide a pavement cutting device which combines a rapid pavement cutting rate with a long service life for its cutter discs.

It is a further object to provide a pavement cutting device which incorporates a plurality of aligned, spaced-apart cutter discs of equal diameter, each of which discs cuts an equal portion of the depth of a kerf.

Yet another object of the invention is to provide a pavement cutting device of the aforedescribed nature which is adapted to be power-driven across the surface of the pavement to be cut.

It is an additional object of the present invention to provide a pavement cutting device which is simple of design and rugged of construction whereby it may have a long service life.

Another object of the invention is to provide a pavement cutting device which does not require the services of a skilled operator in its pavement-cutting operation.

A yet further object of the invention is to provide a pavement cutting device which incorporates novel means for obtaining the desired depth of kerf.

It is an additional object to provide a pavement cutting device especially adapted to utilize cutter discs formed of abrasive material, the periphery of which discs are progressively worn down during pavement cutting operations.

These and other objects of the present invention will become apparent from the following detailed description of a preferred embodiment thereof, when taken in conjunction with the appended drawings wherein:

Figure 1 is a general perspective view of a first form of a pavement cutting device embodying the present invention;

Figure 2 is a vertical sectional view taken on line 2—2 of Figure 1;

Figure 3 is a fragmentary horizontal sectional view taken on line 3—3 of Figure 2;

Figure 4 is a fragmentary vertical sectional view taken on line 4—4 of Figure 2;

Figure 5 is a vertical sectional view taken on line 5—5 of Figure 1;

Figure 6 is an enlarged fragmentary view of a detail shown in Figure 5;

Figure 7 is a vertical sectional view taken on line 7—7 of Figure 6;

Figure 8 is a fragmentary side elevational view taken from the point indicated by the numeral 8 in Figure 5;

Figure 9 is an enlarged horizontal sectional view taken on line 9—9 of Figure 1;

Figure 10 is a diagrammatic showing of a detail of said device;

Figure 11 is a diagrammatic showing of another detail of said device;

Figure 12 is a side elevational view taken partly in vertical section and disclosing a second form of pavement cutting device embodying the present invention;

Figure 13 is a fragmentary top plan view taken partly in horizontal section and showing the rear portion of said second form of pavement cutting device;

Figure 14 is a fragmentary vertical sectional view taken on line 14—14 of Figure 13;

Figure 15 is a fragmentary view taken partly in vertical section from the point designated 15 in Figure 12; and Figures 16 and 17 are diagrammatic views showing the mode of operation of said second form of pavement cutting device.

Referring to Figures 1 through 11 of the first form of device comprising the present invention broadly comprises a main frame generally designated F, supported for movement across a slab of pavement 22 by front wheels 24 and rear wheels 26. The frame F rotatably supports a pair of longitudinally aligned, spaced-apart cutter discs 28 and 30. Power-operated means in the form of an air-cooled internal combustion engine 32 serves to effect rotation of the front wheels 24, as well as the rotation of the cutter discs 28 and 30 whereby the frame F may be moved across the surface of the pavement 22 and form a groove or kerf 34 therein during such movement.

More particularly, the frame F may be substantially rectangular in plan form. As shown in Figure 5, there is pivotally secured to the front end of the frame by a vertical pin 36, a transverse L-shaped axle support 38. This axle support 38 rigidly mounts a horizontal tube 40 wherein a front axle 42 is rotatably carried. Preferably, one of the front wheels (shown at the left in Figure 5) is permanently keyed to the front axle 42 while the other may be selectively keyed to this axle by a removable pin 44. Upon removal of this pin 44, this latter wheel may rotate independently of the front axle. This construction is provided for a purpose to be hereinafter described.

With reference to Figures 2, 3, and 4, the rear wheels 26 are adapted to be moved toward and away from the underside of the frame F whereby the frame may be pivoted vertically about the axis of the front axle 42. To this end, the rear axle 46 is rotatably carried by a pair of horizontal tubes 48 rigidly secured to the lower ends of a pair of upstanding columns 50 and 51. These columns 50 and 51 are slidably disposed within a pair of vertically extending sleeves 52 mounted by the rear portion of the frame F. The upper ends of the columns rigidly mount a horizontal cross-piece 54, which cross-piece rotatably journals a vertically extending crank rod 56 at its mid-section. The lower portion of this crank rod 56 is formed with external threads 58 engageable with a nut 60 rigidly mounted by the frame F. With this arrangement, rotation of the crank rod 56 will effect vertical movement of the rod, the cross-piece 54, the columns 50 and 51, the tubes 48, and hence the rear axle 46, whereby the rear axle will be urged toward or away from the underside of the frame F, depending upon the direction the crank rod 56 is rotated.

With particular reference to Figures 2 and 3, the vertically extending sleeves 52 will preferably be mounted by a transverse L-shaped element 62. This element 62 is pivotally secured at its right side to the frame F by means of column 51. The left side of this element 62 is adapted to be moved longitudinally relative to the frame by manipulation of an upstanding adjustment lever 64, shown as having its lower end pivotally secured to the frame F just ahead of the element 62. To this end, the adjustment lever 64 includes a generally U-shaped lower portion which is connected to the left side of the element 62 by a short pivot link 66. Additionally, the floor of the frame F is formed with a longitudinally extending slot 68 wherein column 50 may be moved, while the mid-portion of the element 62 is formed with an elongated longitudinally extending slot 70 providing for movement of the crank rod 56. The element 62 is adapted to be locked in any desired position by means of a bolt and nut combination 71. With this arrangement, the angle of the rear axle 46 relative to the frame F may be adjusted. Preferably, a pair of tension springs 72 will be interposed between the cross-piece 54 and the element 62 so as to constantly bias the rear axle 46 toward the underside of the frame F. The sleeves 52 may each mount a lock bolt 73 adapted to engage the columns 50 and 51 so as to secure them against vertical movement relative to such sleeves.

Referring now to Figure 8, the angle of the front axle 42 may also be adjusted relative to the frame F. Such adjustment is provided by means of an upstanding lever 74 shown pivotally mounted at its lower end to the side of the frame, and a short pivot link 76 pivotally connected at its front end to lever 74 and at its rear end to an upstanding ear 78 rigidly secured to the axle support 38.

The cutter discs 28 and 30 are each keyed to a similar transverse shaft 80, each shaft 80 being carried by a strap-type bearing 82 rigidly secured to the frame F. The ends of these shafts opposite the cutter discs are keyed to pulleys 84. The cutter discs are enclosed by a guard 86 shown bolted to a brace 88 rigidly secured to the side of the frame. Preferably, the rear portion 86a of the guard 86 will be pivotable upwardly so as to expose the rear cutter disc 28.

With this arrangement, referring to Figure 1, although the device is normally moved forwardly or toward the right in this figure during a cutting operation, it is possible to move it backwardly or to the left so as to cut into an upstanding curb or the like.

The cutter discs 28 and 30 are each provided with a nozzle, generally designated 87, shown in detail in Figure 9. Each nozzle 87 may be formed of a tube 90 having a longitudinally extending slot 92. The front of the tubes 90 are adapted to be placed in communication with a source of coolant (generally water) by means of hoses 93. Such coolant may be supplied from a tank carried on the device or from any other suitable source. When the cutter discs are undergoing rotation, coolant flowing through the slots 92 will tend to be urged radially outwardly over the cutter discs by means of centrifugal force.

The engine 32 is rigidly secured to the upper surface of the frame F adjacent a fuel tank 94. Referring to Figures 5 and 10, the engine's drive shaft mounts a pulley 98 which is directly connected to the pulleys 84 by means of belts 100 whereby the cutter discs 28 and 30 may be rotated. The engine drive shaft also mounts a second pulley 102 which is connnected to the input pulley 104 of a speed-varying mechanism 106 by a belt 108. The output pulley 110 of this speed-varying mechanism 106 is connected to a pulley 112. The latter pulley is keyed to the input shaft 113 of a gear reduction mechanism 114 by another belt 116. The output shaft 118 of the gear reduction mechanism drives a power shaft 120 shown journaled by the upper end of a vertical lever member 122; a transfer shaft 123 being interposed between output shaft 118 and power shaft 120. It should be noted that universal joints 124 connect the ends of the transfer shaft 123 to the shafts 118 and 120.

Referring now to Figures 6 and 7, the lever member 122 is vertically slidably carried by an upstanding bracket 125 rigidly secured at its lower end to the front axle support 38, as by welding. To this end, the bracket 125 is formed with an elongated slot 126 which slidably receives a bolt 128 rigidly mounted by the lever member 122. A nut and washer combination 129 is provided for the end of this bolt 128. The lower end of the lever member 122 may be provided with a guide pin 130 disposed in a hole 131 formed in the lower portion of the bracket 125. Rigidly secured to the lever member 122 above the bolt 128 is an ear 132, which ear is formed with a threaded vertical bore 134 for receiving a crank rod 136 having external threads 138. The lower end of this crank rod 136 bears against the upper surface of the frame F. With this arrangement, the crank rod 136 may be rotated so as to effect relative vertical movement of the power shaft 120 toward and away from the upper surface of the frame F, and hence from the front axle 42.

Referring again to Figure 5, it will be observed that the power shaft 120 mounts a pair of driving pulleys 140. Those pulleys are connected by a pair of belts 141 to a pair of driven pulleys 142, which pulleys 142 are keyed to the front axle 42. In this manner, rotation of the engine's drive shaft may effect concurrent rotation of the front axle 42, and hence of the front wheels 24. The rotational speed of the power shaft 120 may be controlled by manipulation of an upstanding control handle 146 extending from the speed-varying mechanism 106, while the amount of driving power or torque transferred from the power shaft to the front wheels may be controlled by rotation of the crank rod 136. In this regard, the lever member 122, crank rod 136, and bracket 124 constitute a clutch mechanism.

The device is adapted to be manipulated to the location where a kerf is to be formed by means of a handle 150, the lower ends of which are selectveily insertable within pockets 152a formed at the rear of the frame F, or pockets 152b formed at the front thereof. With this arrangement, assuming that no power is being transmitted to the front wheels 24, the handle 150 may be inserted in the front pockets 152b, the portion 86a of the guard 86 may be raised and the device may be urged rearwardly whereby the rear cutter disc 28 may cut into an upstanding curb or the like.

In order that a straight kerf may be formed during a cutting operation, the front of the frame F may be provided with a pointer member 160 which pointer member includes a finger 162 adapted to be disposed on a line extending parallel to, or conforming to the line along which a kerf is to be formed. Preferably, this pointer member 160 will be removably secured to the front of frame F.

In operation the device is moved to the location where a kerf is to be cut. Next, with the engine 32 running and coolant flowing through the nozzles 87, the crank rod 56 may be rotated so as to lower the rear portion of the frame and hence the cutter discs 28 and 30 to the proper depth and the lock bolts 73 tightened. Thereafter, the handle 146 of the speed-varying mechanism 106 and the crank rod 136 may be manipulated so as to attain the desired rate of travel adjustment of the device across the pavement, as well as the desired tractive force transmitted to the front wheels 24. This tractive force should be so adjusted that, should the cutter discs 28 and 30 encounter an extraordinarily hard substance, as for example a piece of metal embedded in the pavement, the device will move forwardly at a reduced rate of speed. In this manner, damage to the cutter discs may be avoided. After the speed-varying mechanism 106 and the crank rod 136 have been properly adjusted, the device may be released whereby it may travel under its own power across the surface of the pavement to be cut. Should this pavement surface be inclined to the horizontal, it may be necessary to adjust the angle of the front axle 42 as well as the angle of the rear axle 46 relative to the frame F in order that the device will follow a straight path and hence form a straight kerf. The straightness of the kerf being formed may be checked by means of the pointer member 160.

At this point is should be noted that the aforedescribed device readily lends itself to being towed behind a truck or automobile. In order to accomplish such towing, the rear end of the device may be lifted off the ground and attached, as by means of a tow bar, to the rear of the towing vehicle. Thereafter, the pin 44 normally disposed within one side of the front axle 42 may be removed. Upon such removal, the front wheels 24 will rotate independently of one another so as to avoid excess tire wear when the device is being towed around a corner.

Referring now to Figure 11, it should also be particularly noted that each of the cutter discs 28 and 30 cut exactly one-half of the depth of the kerf formed by the device. This is true since the cutter discs are of equal diameter and their centers are disposed on a straight line that extends through the axis about which they pivot, i.e., the axis of the rotation of the front wheels 24. Also, the distance between the axes of these discs is equal to the distance between the axis of the leading disc and the axis of rotation of the front wheels 24. With this arrangement, a long service life of these cutter discs may be obtained.

Referring now to Figures 12 through 17, there is disclosed a second form of pavement cutting device embodying the present invention. This second form is especially adapted for use with cutter discs formed of abrasive material, the periphery of which discs are progressively worn away as the pavement cutting operation continues. The wearing away of the periphery of such discs progressively reduces their diameter.

The second form of pavement cutting device is generally similar to the aforedescribed first form, shown in Figures 1 through 11. The second form includes a main frame generally designated F' supported for movement across a slab of pavement 22 by front wheels 200 and rear wheels 202. The frame F' rotatably supports a pair of longitudinally aligned, spaced-apart cutter discs 204 and 206. An air cooled internal combustion engine 32 serves to effect rotation of the front wheels 200 as well as rotation of the cutter discs 204 and 206 in the same manner as described hereinbefore with regard to the first form of pavement cutting device. The second form of pavement cutting device differs from the first form, primarily by the provision of a different structural arrangement for controlling the relative elevation of the rear wheels 202 relative to the rear portion of the frame F'. The second form is also provided with means for controlling the relative elevation of the front wheels 200 relative to the front portion of the frame F', for a reason to be fully set forth hereinafter.

The structural arrangement for controlling the relative elevation between the rear wheels 202 and the rear portion of the frame F' is particularly disclosed in Figures 12, 13, and 14. Referring to these figures, it will be observed that a pair of vertically and rearwardly extending sleeves 210 and 212 have their lower ends rigidly affixed as by welding to the rear portion of the frame F'. Slidably disposed within these two sleeves 210 and 212 are a pair of rigid columns 214 and 216, respectively. Openings 215 are formed in the frame F' adjacent the lower ends of the sleeves 210 and 212 to receive the columns 214 and 216. The lower ends of the columns 214 and 216 are rigidly affixed as by welding to a pair of bearing blocks 217. The pair of bearing blocks 217 receive the rear axle 221. A length of link chain extends between a tie bolt 219 carried by the upper end of each column 214 and 216 and the rear axle bearing blocks 217, these chains being designated 218 and 220, respectively. The upper ends of the sleeves 210 and 212 are each formed with a bracket 222 and 223. A pair of sprockets 224 and 225 are rotatably carried by these brackets 222 and 223, the sprockets being keyed to the outer portions of a horizontal shaft 226. The teeth of the sprockets 224 and 225 are engaged with the links of the chains 218 and 219. A second sprocket 228 of larger diameter is keyed to one end of the shaft 226.

As indicated in Figure 12, an upwardly and rearwardly extending post 230 has its lower end rigidly affixed to the intermediate portion of the frame F' at one side thereof. The upper end of this post 230 is formed with a bearing sleeve 232. A short horizontal shaft 234 is journaled within this bearing sleeve 232. A sprocket 236 is keyed to the intermediate portion of this shaft 234 and a crank handle 238 is keyed to the outer end thereof. A looped link chain 240 interconnects the sprockets 236 and 228 for concurrent rotation. As shown in Figure 13, the upper ends of the rigid columns 214 and 216 are rigidly interconnected by a horizontal cross-piece 242. The mid-portion of this cross-piece 242 carries an eye member 244. The eye member 244 is affixed to the rear end of a length of cable 246. The intermediate portion of this cable 246 extends over an idler pulley 248 carried by the rear portion of the frame F'. The front end of the cable 246 is affixed to the rear end of a spiral tension spring 258. The front end of the spiral tension spring 258 is affixed to the front end of the frame F' at the latter's mid-portion.

With the aforedescribed arrangement, the elevation of the rear portion of the frame F' may be controlled by rotation of the crank handle 238. Such rotation will, by means of the chain 240 and the sprocket 228, effect concurrent rotation of the shaft 226. This rotation of the shaft 226 will effect concurrent rotation of the two sprockets 224. The rotation of the elevation control sprockets 224 will effect vertical movement of the chains 218 and 219 and, hence, of the columns 214 and 216. The strength of the spring 258 should be such that it counterbalances the weight of the rear portion of the frame F'. Accordingly, once the crank handle 238 has been adjusted to the desired position, the spring 258 will by means of the cable 248, the cross-piece 242, and the columns 214 and 216 retain the frame F' at the selected elevation.

The arrangement for controlling the elevation of the front of the frame F' relative to the front wheels 200 is disclosed particularly in Figures 12 and 15. Referring to these two figures, it will be observed that a pair of upstanding sleeves 260 and 262 have their lower ends rigidly affixed as by welding to the front portion of the frame F'. The lower ends of the sleeves 260 and 262 are aligned with a pair of bores 264 and 266, respectively, formed through the frame F'. A pair of vertically extending columns 268 and 270 are slidably disposed within the sleeves 260 and 262, respectively. The lower ends of these columns 268 and 270 are rigidly affixed as by welding to a rigid cross member 271. The cross member 271 serves to support the front axle 274. A pair of coil compression springs 272 and 273 are interposed between the upper surface of the cross member 271 and the underside of the frame F'. These springs 272 and 273 encircle the lower portion of the columns 268 and 270, respectively.

The upper end of the columns 268 and 270 are bifurcated and are formed with transversely extending pivot pins 277 that receive slots 277ᵃ formed on the front end of a pair of crank arms 276 and 278, respectively. The rear ends of these crank arms 276 and 278 are keyed to a horizontal shaft 280. The outer ends of this shaft 280 are rotatably carried by the upper ends of a pair of upstanding brackets 282 and 284 having their lower ends rigidly affixed as by welding to the frame F'. The rear end of the crank arm 272 is integral with the lower end of an adjustment lever 286. The upper portion of the adjustment lever 286 pivotally carries the intermediate portion of a hand grip 288. A leaf spring 290 interposed between the hand grip 288 and the upper end of the adjustment lever 286 constantly biases the hand grip 288 in a clock-wise direction relative to Figure 12. The rear end of the hand grip 288 is slotted so as to receive the upper end of a vertical force-transfer lever 292. The lower end of this force-transfer 292 is carried within a slot formed in the rear portion of a rocker element 294. The intermediate portion of this rocker element 294 is pivotally affixed to the intermediate portion of the adjustment lever 286. The front end of the rocker element 294 is slotted so as to receive the upper end of a vertically extending lock pin 296. The lock pin 296 is slidably disposed within a vertical bore 298 formed in a forwardly directed extension 300 of the adjustment lever 298. The lower portion of the lock pin 296 is selectively adapted to be disposed within one of a plurality of pockets 302 formed in a generally arcuate quadrant 306. The front end of this quadrant 306 is integrally connected to the upper end of an upstanding bracket 208. The lower end of this bracket 308 is rigidly affixed as by a bolt 310 to the frame F'.

With the aforedescribed arrangement, it is possible to vary the elevation of the front axle support 272 relative to the frame F' by forward or rearward movement of the adjustment lever 286. Such movement of the adjustment lever is permitted when the upstanding portion of the hand grip 288 is urged rearwardly against the force of the leaf spring 298. This movement of the hand grip 288 serves to lift the lock pin 296 relative to the pockets 302 of the quadrant 306.

In the operation of the second form of pavement cutting device, with the engine running and coolant flowing to the cutter blades 204 and 206, the crank handle 238 is rotated so as to lower the cutter discs 204 and 206 into the pavement to the proper depth. Thereafter the frame will be caused to move forwardly across the pavement so as to cut the kerf. As indicated in Figure 16, the spacing and alignment of the cutter discs 204 and 206 relative to the front wheels 200 is initially the same as that described in conjunction with the first form of pavement cutting device. Thus, the two cutter discs 204 and 206 are of equal diameter and their centers are disposed on a straight line that extends through the axes about which they pivot, i.e., the axes of rotation of the front wheels 200. Likewise, the distance between the center of the leading disc and the axis of rotation of the front wheels 200 is the same as the distance between the centers of the two discs. Accordingly, each of the cutter discs 204 and 206 will cut exactly one half the depth of the kerf formed by the device.

As noted hereinabove, the second form of cutting device is especially adapted for use with cutter discs which are progressively worn down during pavement cutting operations whereby their diameter is gradually reduced. Referring now to Figure 17, it will be apparent that upon a reduction in diameter of the two cutter discs they will not continue to cut exactly one-half the depth of the kerf unless some provision is made for re-aligning them relative to the axis about which they pivot. Thus, comparing Figure 17 with Figure 16, it will be observed that the diameter of the cutter discs has been reduced from their original diameter shown in Figure 16. Accordingly, a straight line extended through the centers of the two cutter discs no longer passes through the axis about which they pivot, i.e., the axis of rotation of the front wheels, and if the cutter discs are pivoted downwardly about the original axis of rotation of the front wheels they will no longer each cut exactly one half the depth of the kerf. In order to compensate for this condition, it is necessary to vertically adjust the axis of rotation of the front wheels in order that a straight line extended through the centers of the cutter discs may again pass through the axis of rotation of the front wheels. This adjustment is readily accomplished by moving the adjustment lever 286 forwardly so as to raise the front portion of the frame F' relative to the front wheels 200.

Various modifications and changes may be made with respect to the foregoing detailed description without departing from the spirit of the invention or the scope of the following claims. By way of example, although in the foregoing description the axis about which the cutter discs are pivoted corresponds to the axes of rotation of the front wheels, it will be apparent that the axis about which this pivoting occurs could be other than the axis of rotation of the front wheels.

I claim:

1. A pavement cutting device, comprising: a frame adapted to be moved across the surface of said pavement; front wheel means for said frame; rear wheel means for said frame; a pair of longitudinally-aligned, spaced-apart, equal-diameter cutter discs rotatably supported by said frame with their centers being disposed on a straight line extending rearwardly from the axis of rotation of said front wheel means, the distance between the centers of said cutter discs being equal to the distance between the center of the leading cutter disc and the axis of rotation of said front wheels means, said cutter discs cutting a kerf in said pavement as said frame is moved across said pavement, said cutter discs originally being spaced above the lower periphery of said wheel means in order that said device may be moved into cutting position; and adjustment means interposed between said rear wheels and said frame for controlling the relative elevation between said rear wheel means and the rear portion of said frame whereby in readiness for a cutting operation the rear portion of said frame may be lowered relative to said rear wheels and said cutter discs will descend into cutting position with said rear cutter disc lower than said front cutter disc in order that each cutter disc will cut one half of the depth of said kerf.

2. A pavement cutting device, comprising: a frame adapted to be moved across the surface of said pavement; front wheel means for said frame; rear wheel means for said frame; a pair of longitudinally-aligned, spaced-apart, equal-diameter cuttere discs rotatably supported by said frame with their centers being disposed on a straight line extending rearwardly from the axis of rotation of said front wheel means, the distance between the centers of said cutter discs being equal to the distance between the center of the leading cutter disc and the axis of rotation of said front wheel means, said cutter discs cutting a kerf in said pavement as said frame is moved across said pavement, said cutter discs originally being spaced above the lower periphery of said wheel means in order that said device may be moved into cutting position; adjustment means interposed between said rear wheels and said frame for controlling the relative elevation between said rear wheel means and the rear portion of said frame whereby in readiness for a cutting operation the rear portion of said frame may be lowered relative to said rear wheels and said cutter discs will descend into cutting position with said rear cutter disc lower than said front cutter disc in order that each cutter disc will cut one half of the depth of said kerf; and second adjustment means interposed between said front wheel means and said frame for controlling the relative elevation between said front wheel means and the front portion of said frame.

3. A pavement cutting device, comprising: a frame adapted to be moved across the surface of said pavement; front wheel means for said frame; rear wheel means supported by a transverse axle; tube means rotatably supporting said axle; a pair of vertical columns secured at their lower ends to said tube means; a pair of sleeves attached to said frame and encompassing said columns; locking means mounted by said sleeves for selective engagement with said columns; a transverse cross-piece bridging the upper portion of said columns; a vertically extending crank rod rotatably carried by said cross-piece, the lower portion of said rod being formed with threads; a nut secured to said frame and engaged by the lower portion of said crank rod; and a pair of longitudinally-aligned spaced-apart cutter discs of equal diameter rotatably supported by the rear portion of said frame with the centers of said cutter discs being disposed on a straight line extending rearwardly from the axis of rotation of said front wheel means, the distance between the centers of said cutter discs being equal to the distance between the center of the leading cutter disc and the axis of rotation of said front wheel means whereby each of said cutter discs will cut one-half the depth of said kerf.

4. A pavement cutting device, comprising: a frame adapted to be moved across the surface of said pavement; front wheel means for said frame; rear wheel means supported by a transverse axle; tube means rotatably supporting said axle; a pair of vertical columns secured at their lower ends to said tube means; a pair of sleeves attached to said frame and encompassing said columns; a transverse cross-piece bridging the upper portion of said columns; a vertically extending crank rod rotatably carried by said cross-piece, the lower portion of said rod being formed with threads; a nut secured to said frame and engaged by the lower portion of said crank rod; tension spring means interposed between said cross-piece and said frame; lock bolt means mounted by said sleeves for selective locking engagement with said columns; and a pair of longitudinally-aligned, spaced-apart cutter discs of equal diameter rotatably mounted by the rear portion of said frame, the centers of said cutter discs being disposed on a straight line extending rearwardly from the axis of rotation of said front wheel means, the distance between the centers of said cutter discs being equal to the distance between the center of the leading cutter disc and the axis of rotation of said front wheel means whereby each of said cutter discs will cut one-half the depth of said kerf.

5. A pavement cutting device, comprising: a frame adapted to be moved across the surface of said pavement; front wheels for said frame; rear wheels for said frame; vertically extending column means for supporting said rear wheels; means on said frame slidably supporting said column means for vertical movement relative to said frame; means on the upper portion of said column means rotatably mounting a vertically extending crank rod, the lower portion of said crank rod being threaded; and a nut connected to said frame and engaged by the lower portion of said crank rod whereby rotation of said crank rod will control the relative elevation between said rear wheels and the rear portion of said frame; and a pair of equal-diameter cutting discs rotatably supported by said frame for cutting a kerf in said pavement as said frame is moved thereacross, with the centers of said cutter discs being disposed on a straight line extending rearwardly from the axis of rotation of said front wheel means, the distance between the centers of said cutter disc being equal to the distance between the center of the leading cutter disc and the axis of rotation of said front wheel means whereby each of said cutter discs will cut one-half the depth of said kerf, said cutter discs originally being spaced above the lower periphery of said wheels in order that said device may be moved into cutting position, said crank rod being rotated in readiness for a cutting operation whereby the rear portion of said frame may be lowered relative to said rear wheels and said cutter discs will descend into cutting position.

6. A pavement cutting device for cutting pavement that is inclined to the horizontal, comprising: a frame; power plant means on said frame; front wheel means on said frame; rear wheel means on said frame supported by a transverse axle; means drivingly coupling said power plant means to one of said wheel means whereby said frame is driven across the surface of said pavement; adjustment means interposed between said transverse axle and the rear portion of said frame to control the relative elevation between said rear wheel means and the rear portion of said frame; additional adjustment means interposed between said frame and one of said wheel means to control the angle of said wheel means relative to the frame in order that said device will follow a straight path across said pavement where the latter is inclined to the horizontal; and a pair of longitudinally-aligned, spaced-apart cutter discs of equal diameter rotatably mounted by the rear portion of said frame, the centers of said cutter discs being disposed on a straight line and extending rearwardly from the axis of rotation of said front wheel means, the distance between the centers of said cutter discs being equal to the distance between the center of the leading cutter disc and the axis of rotation of said front wheel means whereby each of said cutter discs will cut one-half the depth of said kerf.

References Cited in the file of this patent

UNITED STATES PATENTS

| | | |
|---|---|---|
| 909,059 | Card | Jan. 5, 1909 |
| 1,603,821 | Watters | Oct. 19, 1926 |
| 2,502,043 | Howard | Mar. 28, 1950 |
| 2,606,011 | Lommen | Aug. 5, 1952 |

FOREIGN PATENTS

| | | |
|---|---|---|
| 551,996 | Great Britain | Mar. 18, 1943 |